United States Patent [19]
Nigol

[11] 3,778,527
[45] Dec. 11, 1973

[54] MEANS FOR PREVENTING OR INHIBITING GALLOPING VIBRATIONS IN OVERHEAD TRANSMISSION LINES

[76] Inventor: Olaf Nigol, 272 Markland Dr., Etobicoke, Ontario, Canada

[22] Filed: Mar. 23, 1972

[21] Appl. No.: 237,380

[52] U.S. Cl. .................................. 174/42, 174/130
[51] Int. Cl. ......................... H02g 7/14, H01b 5/08
[58] Field of Search ..................... 174/42, 108, 127, 174/128, 129 R, 130, 131 R, 131 A, 131 B; 188/1 B, 266, 268

[56] References Cited
UNITED STATES PATENTS

| | | | |
|---|---|---|---|
| 2,694,101 | 11/1954 | Shuhart | 174/42 |
| 2,999,894 | 9/1961 | Binder | 174/42 |
| 1,676,006 | 7/1928 | Crook | 174/42 |
| 1,901,860 | 3/1933 | Austin | 174/42 |
| 2,215,541 | 9/1940 | Buchanan et al. | 174/42 |
| 2,271,935 | 2/1942 | Buchanan et al. | 174/42 |
| 2,849,777 | 9/1958 | Ridgers et al. | 174/42 X |

FOREIGN PATENTS OR APPLICATIONS

| | | | |
|---|---|---|---|
| 574,610 | 4/1959 | Canada | 174/42 |
| 834,931 | 2/1970 | Canada | 174/42 |
| 616,802 | 11/1926 | France | 174/108 |
| 708,630 | 5/1931 | France | 174/108 |
| 398,516 | 7/1924 | Germany | 174/128 |
| 805,872 | 12/1958 | Great Britain | 174/42 |

OTHER PUBLICATIONS

Burgess et al., AIEE Technical Paper 51-205, "The Torsional Damper for Conductors–Service Experience and Further Experimental Work", published May 1951, 8 pages.

*Primary Examiner*—Laramie E. Askin
*Attorney*—J. A. Legris et al.

[57] ABSTRACT

In combination with a transmission line conductor suspended from a stationary support structure to which it is connected at a plurality of longitudinally spaced points, the suspended conductor defining a torsionally oscillating system, torsional restraint means connected to or incorporated in the conductor at each span intermediate said spaced points for limiting torsional movements whereby to prevent build up of galloping vibrations.

12 Claims, 9 Drawing Figures

PATENTED DEC 11 1973 3,778,527

MEANS FOR PREVENTING OR INHIBITING GALLOPING VIBRATIONS IN OVERHEAD TRANSMISSION LINES

This invention relates to a system for preventing or inhibiting the build up of galloping vibration in overhead transmission lines.

The seriousness of conductor vibration in overhead transmission lines has been recognized for many years, and many attempts have been made to control it. Evidence has shown that when conductor vibration is left uncontrolled it will result in fatigue failure of conductors; large amplitude vibrations may also lead to structural damage in line supports and the like. Furthermore, the occurrence of large amplitude vibrations makes it necessary to provide adequate clearance between the phase conductors of a transmission line to prevent flash-over, a measure which involves considerable cost.

Conductor vibration in overhead transmission lines is divided arbitrarily into two categories: galloping and aeolian vibration. The term "galloping" is applied to large amplitude, low frequency vibrations, induced in most cases by wind action on aerofoils. The term "aeolian" is applied to relatively small amplitude, high frequency, vibrations also induced by wind action but in a different manner. The present invention is concerned primarily with vibrations of the former type.

Investigations made by the inventor into the nature of galloping vibrations have shown that such vibrations in iced conductors are initiated and maintained by torsional instability and oscillation of the conductors. Briefly, the excitation mechanism may be described in the following way. As ice deposits on the windward side of a conductor it produces a torsional load which causes the conductor to rotate. The angle of rotation or twist depends upon the amount of ice deposited, the shape of the deposit, and the natural torsional stiffness of the conductor. Since the torsional stiffness of the conductor varies inversely with the distance from the torsionally rigid suspension points, the angle of rotation will be greatest for the centre portion of the span. Now the eccentric ice load deposited on the conductor acts as an aerofoil which, when acted upon by the wind, exhibits definite aerodynamic moment, drag and lift characteristics. The moment and lift forces are the most significant in relation to galloping. The magnitudes of these aerodynamic forces are directly proportional to the square of the wind speed, and are largely dependent upon the orientation of the ice-formed aerofoil.

In considering the natural torsional stiffness of the conductor, the moment due to the eccentric ice load, and the aerodynamic moment of the iced conductor, one finds that the effective torsional stiffness of the conductor span becomes very low for a range of wind speeds and amounts of ice deposited. A low effective torsional stiffness results in low frequency torsional oscillations with several aerofoil orientations. When the torsional frequency coincides with, or is an odd multiple of, one of the resonant translational frequencies, the two modes of vibration will become strongly coupled and galloping will occur.

Now the amount of ice required to rotate the conductor to a critical orientation in the centre of the span is directly proportional to the natural torsional stiffness of the conductor span and hence inversely proportional to the span length. Consequently, a short span will support a heavier ice load than will a long span before a critical orientation is reached. A short span will also require a higher aerodynamic moment and hence a higher wind velocity before it becomes torsionally unstable. Therefore, one solution to the problem of galloping would be to shorten the conductor spans.

It is an object of the present invention to provide an alternative solution to the problem, based on the above considerations, which is compatible with present design practice wherein the conductor spans may be of considerable length.

Basically, the present invention provides in combination with a transmission line conductor suspended from a stationary support structure to which it is connected at a plurality of longitudinally spaced points, the suspended conductor defining a torsionally oscillating system, torsional restraint means connected to the conductor at each span intermediate said spaced points, or incorporated in the conductor, for limiting torsional movements whereby to prevent build up of galloping vibrations. The torsional restraint means may be adapted to dissipate vibrational energy frictionally between relatively slidable surfaces, or in a body of damping material such as butyl rubber foam, or may be arranged so as to alter the characteristics of the torsionally oscillating system so as to prevent coupling between the torsional and translational modes of oscillation.

In order that the invention may be readily understood, several embodiments thereof will now be described by way of example with reference to the accompanying drawings, in which.

Figure 1:
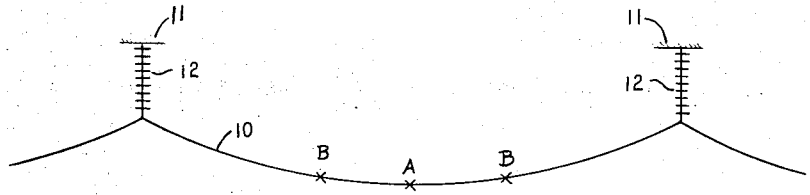
FIG. 1 is a diagrammatic side view showing one span length of a conductor in an overhead transmission line.

Referring to FIG. 1, which may be read in conjunction with each of the embodiments described below, an overhead transmission line comprises a conductor 10 suspended from a stationary support structure 11, which would typically comprise masts or towers. The conductor is connected to the support structure at longitudinally spaced points, defining the span lengths, by support insulators 12; these insulators are conventionally suspended from transverse arms on the masts or towers. In general such a transmission line would comprise a number of such conductors, spaced from one another, but for ease of illustration only one conductor is shown in the drawings. Torsional restraint means are connected to the conductor at each span intermediate the support insulators. Devices of the type shown in FIGS. 2 and 3, FIG. 4, or FIGS. 5 and 6 may be connected to the conductor at the position A midway between the ends of the span, or alternatively in the case of long spans at the positions B which are respectively one third, and two thirds of the distance along each span. Instead of restraining the conductor at discrete points, however, torsional restraint means may be distributed along the length of the conductor, such means being illustrated in FIGS. 7, 8 and 9.

Figure 2:
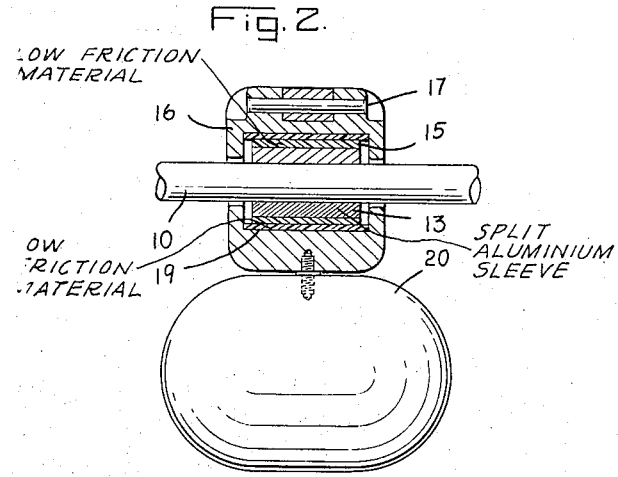
FIG. 2 is a longitudinal sectional view of a torsional restraint means according to one embodiment of the invention.
Figure 3:
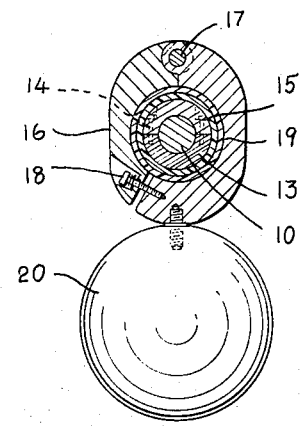
FIG. 3 is a cross sectional view of the torsional restraint means of FIG. 2.

Referring now to FIGS. 2 and 3, the torsional restraint device illustrated comprises a first body 13 in the form of an aluminum split tubular sleeve, the two halves of the sleeve being clamped together by bolts 14 so as to engage the conductor 10 securely. The outer cylindrical surface of the sleeve 13 is coated or clad with a layer of low friction material 15, that is to say, a material having a very low coefficient of friction, such as polytetrafluoroethylene, which provides a first friction surface. Connected to the sleeve 13 is a second body 16 in the form of an aluminum split clamp; this clamp comprises a pair of clamp members connected together by a hinge 17, and secured by means of a spring-loaded adjustable bolt 18 whereby the clamping pressure on the sleeve can be adjusted. The clamp 16 provides an inner surface which is coated with a layer of low friction material 19, this layer providing a second friction surface disposed in sliding engagement with the first friction surface of the layer 15. Torsional movements of the clamp 16 are restrained by means of a cast iron weight 20, suspended from the clamp 16. It is found in practice that the centre of gravity of the weight 20 should be as close as possible to the axis of the conductor 10, and usually not more than about six inches therefrom. The weight may be up to 60 pounds, but may be varied over a range according to conductor diameter; typically, for a single weight per span the weight may be five pounds for a half inch diameter conductor and about 50 pounds for a two and a half inch diameter conductor.

In a variant of the embodiment described above the first and second bodies are replaced by a stack of coaxial aluminum discs, the discs being secured alternatively to the conductor and to the weight, and the cooperating faces of the discs being coated with low friction material and providing the relatively slidable surfaces. In this variant the discs are clamped together under axial pressure.

In the embodiment of the invention described above, and in its variant, torsional movement of the conductor 10 results in relative sliding movement of the surfaces of the layers 15, 19, the kinetic energy of such movement being dissipated frictionally.

Figure 4:
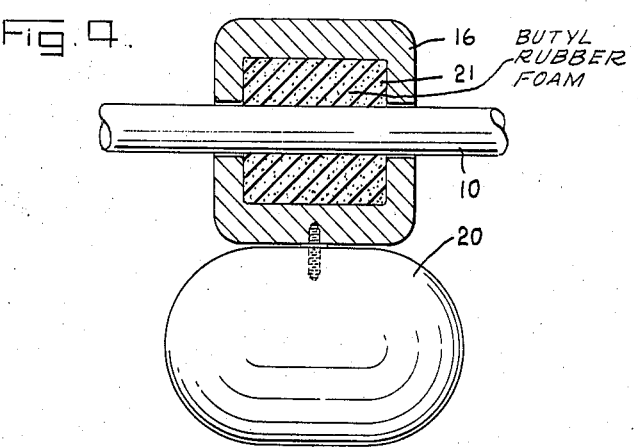
FIG. 4 is a longitudinal sectional view of a torsional restraint means according to a second embodiment of the invention.

Referring now to FIG. 4, the torsional restraining means of the second embodiment comprises a cylindrical body 21 of resiliently deformable material having a high coefficient of internal damping — butyl rubber foam is most suitable for this purpose — firmly clamped onto the conductor 10 by a clamp 16. The clamp 16 is of the same construction as the clamp shown in FIGS. 2 and 3, and is restrained against torsional movements by a weight 20 suspended from the clamp.

In this embodiment, the kinetic energy of torsional movement of the conductor 10, instead of being dissipated frictionally between relatively slidable surfaces, is absorbed within the body 21 by elastic hysteresis.

Figure 5:
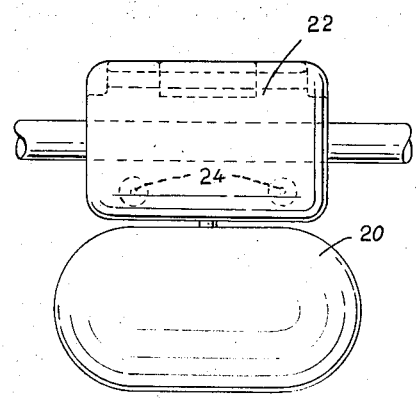
FIG. 5 shows in side elevation a torsional restraint means according to a third embodiment of the invention.
Figure 6:
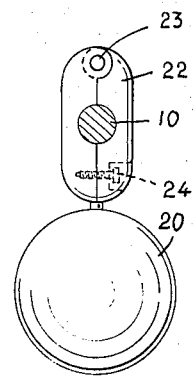
FIG. 6 shows an end elevation of the torsional restraint means shown in FIG. 5.

In the embodiment shown in FIGS. 5 and 6, a split aluminum clamp 22 is clamped securely onto the conductor 10, the clamp 22 providing a clamp hinge 23 and clamping bolts 24. The clamp is restrained against rotation by a weight 20 suspended from the clamp. In this case the weighted clamp provides a high inertial restraint at the point of the conductor to which it is secured, thus in effect altering the characteristics of the torsionally oscillating system. In this way the torsional and translational modes of vibration are decoupled.

Figure 7:
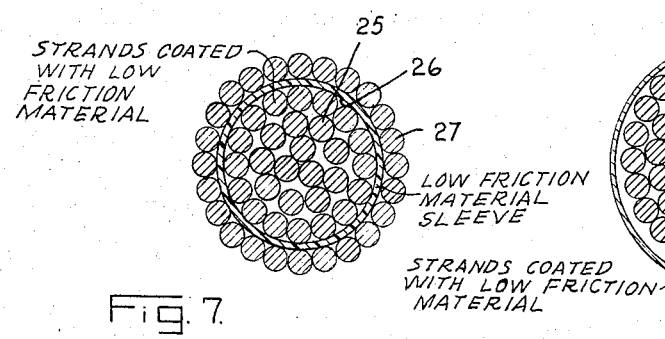
FIGS. 7, 8 and 9 are cross sectional views of three different stranded conductor configurations embodying the invention.
Figure 8:
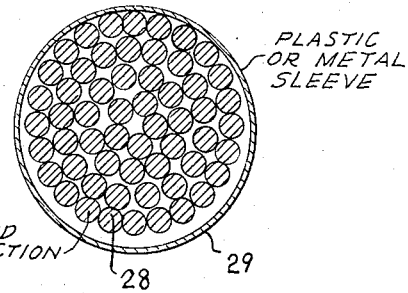
Figure 9:
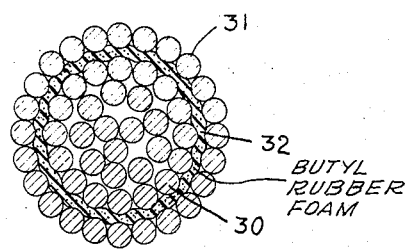

In the embodiments illustrated by FIGS. 7, 8 and 9 torsional restraint means are distributed along the length of the conductors. The conductor shown in FIG. 7 comprises an inner layer of conductor strands 25 which are loosely filled within a flexible tubular sleeve 26, and an outer layer of conductor strands 27 extending along the length of the outer surface of the sleeve in engagement with it. The strands are coated with low friction material, such as the material known by the trade mark "Teflon", and the sleeve is of the same material. In this case kinetic energy resulting from torsional movements is dissipated frictionally between the relatively slidable surfaces of the coated conductor strands.

In the embodiment of FIG. 8, the conductor strands 28 are coated with the low friction material and are loosely fitted within a tubular plastic or metal sleeve 29.

In the embodiment of FIG. 9 the conductor comprises an inner layer of conductor strands 30 and an outer layer of conductor strands 31, on a sleeve 32 of high damping material such as butyl rubber foam separating the layers and being firmly engaged thereby so that relative torsional movements between the layers subject the sleeve to torsional shear. In this way the kinetic energy of such movements is absorbed in the body of the sleeve.

Although the invention has been particularly described with reference to single conductors, it is equally applicable to bundle conductor arrangements. In such an application the individual conductors of a bundle may be held in a fixed spatial relationship at each of said spaced points by means of a rigid spacer, each conductor being secured to the spacer by means for damping torsional movement of the conductor relative to the spacer. The damping means may provide a pair of relatively slidable friction surfaces, as described with reference to FIGS. 2 and 3, or alternatively a deformable body of butyl rubber foam as described with reference to FIG. 4.

What I claim as my invention is:

1. In combination with a transmission line conductor suspended from a stationary support structure to which it is connected at a plurality of longitudinally spaced points, the suspended conductor defining a torsionally oscillating system, torsional damping means connected to the conductor at each span intermediate said spaced points at a distance not less than one third of the length of the span from the nearer of said points, each said damping means comprising a first body rigidly connected to the conductor, the first body providing a first frictional surface arranged coaxially with the conductor, a second body connected to the first body, the second body providing a second frictional surface disposed first body comprises a tubular metallic sleeve secured to the conductor, the sleeve having a coating of low friction material defining said first surface, and the second body comprises a clamp which is clamped onto the sleeve, the clamp providing a sleeve-engaging surace which is coated with said low frictional material. in sliding contact with the first frictional surface, said first and second frictional surfaces being defined by coatings of low friction material on said first and second bodies, and means attached to said second body for restraining torsional movement of the second body so as to permit relative sliding movements between said surfaces.

2. The combination claimed in claim 1, wherein the

3. The combination claimed in claim 2, wherein the clamp comprises a pair of hingedly connected clamping members secured by a spring-loaded adjustable bolt for adjustment of the clamping pressure.

4. The combination claimed in claim 1, there being one said damping means to each span of the transmission line conductor positioned midway between a respective pair of said longitudinally spaced points.

5. The combination claimed in claim 1, there being two said damping means to each span of the transmission line conductor positioned respectively at one third and two thirds of the distance along the span.

6. The combination claimed in claim 1, wherein said means for restraining torsional movements of the second body comprises a weight suspended from the second body.

7. The combination claimed in claim 1, wherein said low friction material is polytetrafluoroethylene.

8. In combination with a transmission line conductor suspended from a stationary support structure to which it is connected at a plurality of longitudinally spaced points, the suspended conductor defining a torsionally oscillating system, torsional damping means connected to the conductor at each span intermediate said spaced points at a distance not less than one third of the length of the span from the nearer of said points, each said damping means comprising a ridid body coupled to the conductor and spaced therefrom by a deformable body susceptible to torsional shear stresses, and means attached to the rigid body for restraining torsional movements of the rigid body so as to cause torsional vibrational energy of the conductor to be dissipated by the deformable body.

9. The combination claimed in claim 8, wherein the deformable body is of butyl rubber foam.

10. The combination claimed in claim 9, wherein said means for restraining torsional movements of the rigid body comprises a weight suspended from the rigid body.

11. In a transmission line conductor suspended from a stationary support structure to which it is connected at a plurality of longitudinally spaced points, the suspended conductor defining a torsionally oscillating system, the improvement in which the conductor consists of a plurality of strands coated with low friction material and loosely fitted within a sleeve of the low friction material.

12. In a transmission line conductor suspended from a stationary support structure to which it is connected at a plurality of longitudinally spaced points, the suspended conductor defining a torsionally oscillating system, the improvement in which the conductor consists of a plurality of strands coated with low friction material and loosely fitted within a sleeve of the low friction material, and an outer layer of strands extending along and engaging the outer surface of said sleeve.

* * * * *

PO-1050
(5/69)

UNITED STATES PATENT OFFICE
CERTIFICATE OF CORRECTION

Patent No. 3,778,527　　　　Dated December 11, 1973

Inventor(s) Olaf Nigol

It is certified that error appears in the above-identified patent and that said Letters Patent are hereby corrected as shown below:

Change the wording of claim 2 to read as follows:

-- The combination claimed in claim 1, wherein the first body comprises a tubular metallic sleeve secured to the conductor, the sleeve having a coating of low friction material defining said first surface, and the second body comprises a clamp which is clamped onto the sleeve, the clamp providing a sleeve-engaging surface which is coated with said low friction material. --

Signed and sealed this 6th day of August 1974.

(SEAL)
Attest:

McCOY M. GIBSON, JR.　　　　　　　　　　C. MARSHALL DANN
Attesting Officer　　　　　　　　　　　　Commissioner of Patents